United States Patent [19]
Kung et al.

[11] Patent Number: 5,946,053
[45] Date of Patent: Aug. 31, 1999

[54] IMAGE ENCODER AND SUBCARRIER SIGNAL GENERATOR

[75] Inventors: Chen-Pang Kung; Pei-Hui Tung, both of Taoyuan Hsien; Yuan-Ping Huang, Hsinchu, all of Taiwan

[73] Assignee: Industrial Technology Research Institute, Hsinchu, Turkey

[21] Appl. No.: 08/959,470

[22] Filed: Oct. 28, 1997

[30] Foreign Application Priority Data

May 9, 1997 [TW] Taiwan ................................. 86106177

[51] Int. Cl.$^6$ ........................................... H04N 9/65
[52] U.S. Cl. ........................... 348/642; 348/493; 327/131
[58] Field of Search ............................ 327/131, 135, 327/136, 126, 129; 348/638–642, 453–458, 493

[56] References Cited

U.S. PATENT DOCUMENTS

| | | | |
|---|---|---|---|
| 4,668,997 | 5/1987 | Nagano et al. | 348/385 |
| 4,727,361 | 2/1988 | Tokumitsu | 348/642 |
| 4,982,179 | 1/1991 | Ogawa et al. | 348/642 |
| 5,402,180 | 3/1995 | Jung et al. | 348/625 |
| 5,486,875 | 1/1996 | Sakurai | 348/642 |
| 5,638,135 | 6/1997 | Mukai | 348/642 |

OTHER PUBLICATIONS (Adel Sedra; Microelectronic Circuits; pp. 227–240) 1987.

*Primary Examiner*—Andrew I. Faile
*Assistant Examiner*—Reuben M. Brown
*Attorney, Agent, or Firm*—Ladas & Parry

[57] ABSTRACT

An image encoder and subcarrier signal generator. The present invention uses a system clock signal to generate a first subcarrier signal and a second subcarrier signal with a phase-delay of 90° behind the first subcarrier signal.

11 Claims, 4 Drawing Sheets

IMAGE ENCODER AND SUBCARRIER SIGNAL GENERATOR

BACKGROUND OF THE INVENTION

1. Field of the Invention

The present invention relates to an image encoder and a subcarrier signal generator, and especially relates to an image encoder sharing a signal source with an image signal processor, and a subcarrier signal generator generating subcarrier signals by itself.

2. Description of the Related Art

In a common color TV system, image data is in the form of image signals R, B, and G. A camera provides these image signals R, B, and G from light of different colors. FIG. 1 depicts a relation between an image encoder 1 and an image signal processor 2 of the prior art. Now refer to FIG. 1, the image signal processor 2 encodes these image signals in a predetermined ratio to output a Y-signal, a U-signal and a V-signal. The U-signal and the V-signal are encoded in the form of a color signal C, which represents chrominance, by the image encoder 1. The Y-signal represents a brightness of black-and-white image data.

In a camera system, phase alternation line (PAL) and national television standards committee (NTSC) are most common color TV systems, wherein pulse signal sources used in NTSC system and PAL system are of 28.6363 MHz and 28.375 MHZ, respectively. As shown in FIG. 1, two pulse signal sources are used as a system clock signal CLK1 and a subcarrier signal CLK2, respectively. A phase-lock loop (PLL) 3 synchronizes the system clock signal CLK1 and the subcarrier signal CLK2 by introducing a fixed phase-difference. However, this prior art is costly and complicated.

SUMMARY OF THE INVENTION

Therefore, the main object of the present invention is to overcome the disadvantages of the prior art. The present invention provides an image encoder and a subcarrier signal generator. The present invention uses a system clock signal to generate two sets of trigonometric signals with a phase-delay of 90° and simplifies the prior art.

The present invention provides an image encoder comprising: a subcarrier signal generator for receiving a system clock signal to generate a first subcarrier signal and a second subcarrier signal, wherein the second subcarrier has a phase-delay of 90° with the first subcarrier signal; a first modulator for modulating the first subcarrier signal and a first image signal into a first modulation signal; a second modulator for modulating the second subcarrier signal and a second image signal into a second modulation signal; an adder for adding the first modulation signal and the second modulation signal to output a synthesis signal; and a clipper for clipping amplitude of the synthesis signal and outputting a color signal.

The subcarrier signal generator of the present invention comprises: a first no-carry N-bit counter with an initial value of 0 for counting an N-bit predetermined value to output a first sawing-wave sampling signal in each period of the system clock signal, wherein each sampling value is N-bit; a second no-carry N-bit counter with an initial value of $2^{N-2}$ for counting the N-bit predetermined value to output a second sawing-wave sampling signal in each period of the system clock signal, wherein each sampling value is of N-bit; a first folder for folding the first sawing-wave sampling signal into a first positive trigonometric sampling signal which is of N+1-bits and has a MSB of 0; a second folder for folding the second sawing-wave sampling signal into a second positive trigonometric sampling signal which is of N+1-bit and has a MSB of 0; a first shifter, shifting the first positive trigonometric sampling signal as the first subcarrier signal which is symmetrical and of N-bit; and a second shifter, shifting the second positive trigonometric sampling signal as the second subcarrier signal which is symmetrical and of N-bit.

DESCRIPTION OF THE DRAWINGS

Other objects, features, and advantages of the present invention will become apparent from the following detailed description made with reference to an illustrative but non-limiting embodiment. The description is made with reference to the accompanying drawings, in which.

DESCRIPTION OF THE PREFERRED EMBODIMENT

Figure 1:
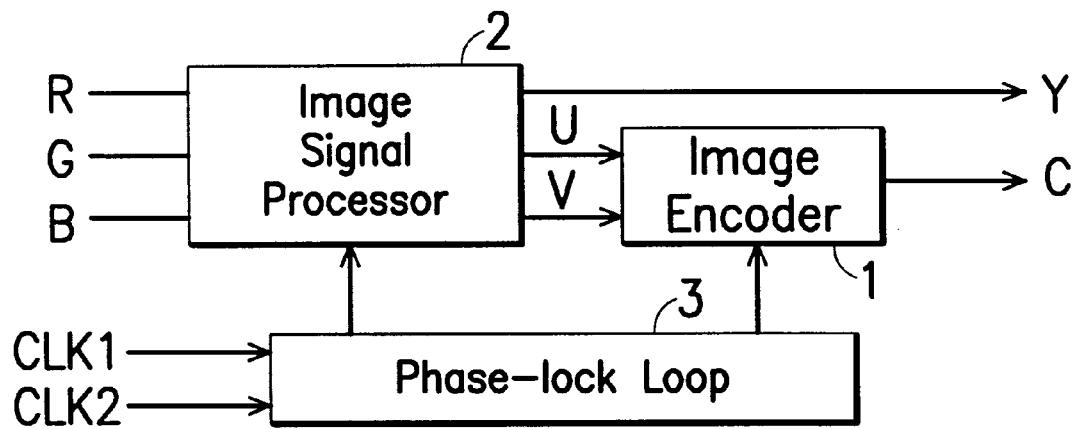
FIG. 1 depicts a diagram of an image encoder and an image signal processor of the prior art.
Figure 2:
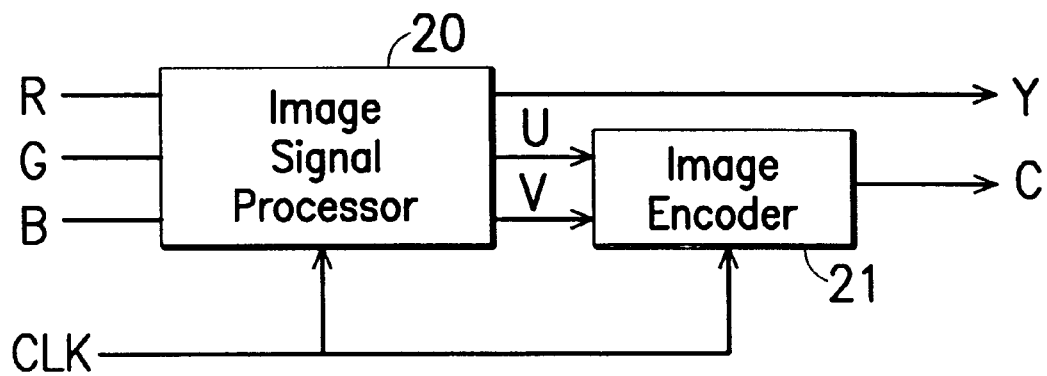
FIG. 2 depicts a diagram of an image encoder and an image signal processor of the present invention.

FIG. 2 depicts a diagram of an image encoder 21 and an image signal processor 20 of the present invention. In FIG. 2, the image signal processor 20 encodes image signals R, B, and G to output a Y-signal, a U-signal, and a V-signal. Then, the U-signal and the V-signal are encoded by the image encoder 21 into a color signal C. The image signal processor 20 and the image encoder 21 share a system clock signal CLK.

Figure 3:
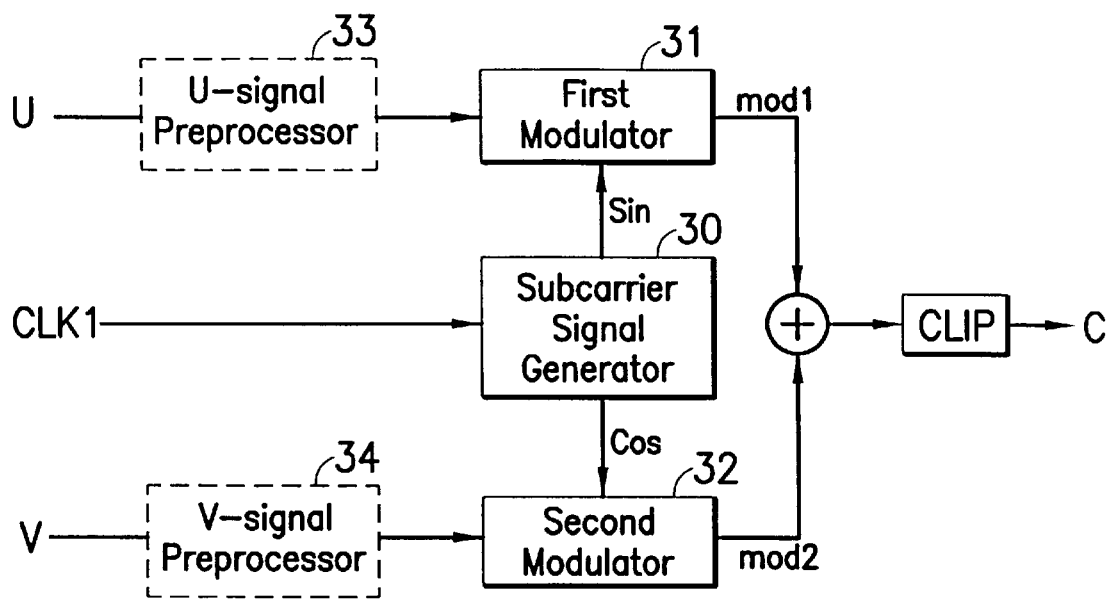
FIG. 3 depicts an internal circuit diagram of the image encoder of the present invention.

FIG. 3 depicts an internal circuit diagram of the image encoder 21 of the present invention. In FIG. 3, a subcarrier signal generator 30 receives the system clock signal CLK to generate a first subcarrier signal sin and a second subcarrier signal cos with a phase-delay of 90° behind the first subcarrier signal sin. A first modulator 31 modulates the U-signal and the first subcarrier signal sin to obtain a first modulation signal mod1. Similarly, a second modulator 32 modulates the Y-signal and the second subcarrier signal cos to obtain a second modulation signal mod2. When necessary, the U-signal and the V-signal can be processed by a U-signal preprocessor 33 and a V-signal preprocessor 34. The first modulation signal mod1 and the second modulation signal mod2 are added to obtain a synthesis signal (not shown in FIG. 3). The synthesis signal is inputted to a clipper CLIP which clips amplitude of the synthesis signal and outputs a color signal C.

In PAL system, the frequency of the system clock and the subcarrier signal are 28.375 MHz and 4.4336 MHz, respectively. In order to encode image signals, the subcarrier signal generator 30 must generate subcarrier signals by itself. In the case of PAL system, the subcarrier signal generator 30 generating subcarrier signals via utilizing system clock signals CLK is stated as follows.

Figure 4:
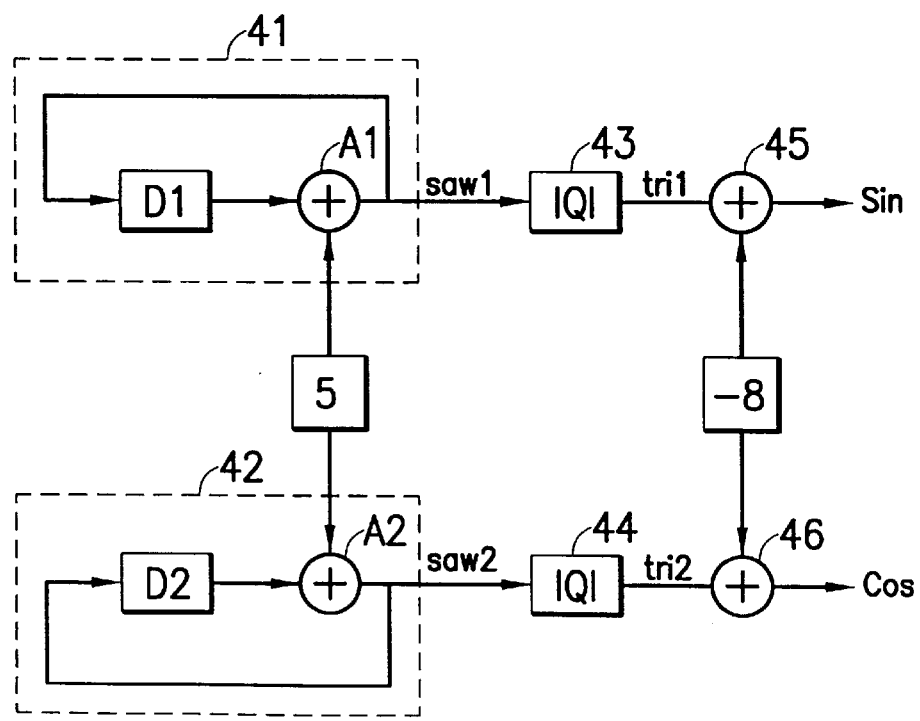
FIG. 4 depicts an internal circuit diagram of the subcarrier signal generator in the image encoder of the present invention.

FIG. 4 depicts an internal circuit diagram of the subcarrier signal generator 30 of the image encoder 21 of the present invention. In FIG. 4, the subcarrier signal generator 30 comprises: a first no-carry N-bit counter 41, a second no-carry N-bit counter 42, a first folder, a second folder, a first shifter, and a second shifter. The operations of each circuit in the subcarrier signal generator 30 are stated as follows.

The first no-carry N-bit counter 41 with an initial value of 0 counts an N-bit predetermined value to output a first sawing-wave sampling signal saw1 in each period of the system clock signal CLK, wherein each sampling value is of N-bit.

The second no-carry N-bit counter 42 with an initial value of $2^{N-2}$ counts the N-bit predetermined value to output a second sawing-wave sampling signal saw2 in each period of the system clock signal CLK, wherein each sampling value is of N-bit.

The first folder 43 folds the first sawing-wave sampling signal saw1 into a first positive trigonometric sampling signal tri1 which is of N+1-bit and has a MSB of 0.

The second folder 44 folds the second sawing-wave sampling signal saw2 into a second positive trigonometric sampling signal tri2 which is of N+1-bit and has a MSB of 0.

The first shifter 45, an adder, adds a predetermined value, $-2^{N-2}$ to the first positive trigonometric sampling signal tri1. Then the first positive trigonometric sampling signal tri1 is shifted as the first subcarrier signal sin which is symmetrical and of N-bit.

The second shifter 46, an adder, adds a predetermined value, $-2^{N-2}$ to the second positive trigonometric sampling signal tri2. Then the second positive trigonometric sampling signal tri2 is shifted as the second subcarrier signal cos which is symmetrical and of N-bit.

N is a positive integer and larger than 5. If in NTSC system, the predetermined value is $4 \times 2^{N-2}$.

The first no-carry N-bit counter 41 further comprises: a first N-bit delay register D1 with an initial value of 0; and a first adder A1 for adding the N-bit predetermined value (in this embodiment, the N-bit predetermined value is 5) and an output of the first N-bit delay register to obtain the first sawing-wave sampling signal saw1 which is fed back to the first N-bit delay register D1.

Similarly, the second no-carry N-bit counter 42 further comprises: a second N-bit delay register D2 with an initial value of $2^{N-2}$; and a second adder A2 for adding the N-bit predetermined value and an output of the second N-bit delay register D2 to output the second sawing-wave sampling signal saw2 which is fed back to the second N-bit delay register D2.

Figure 5:
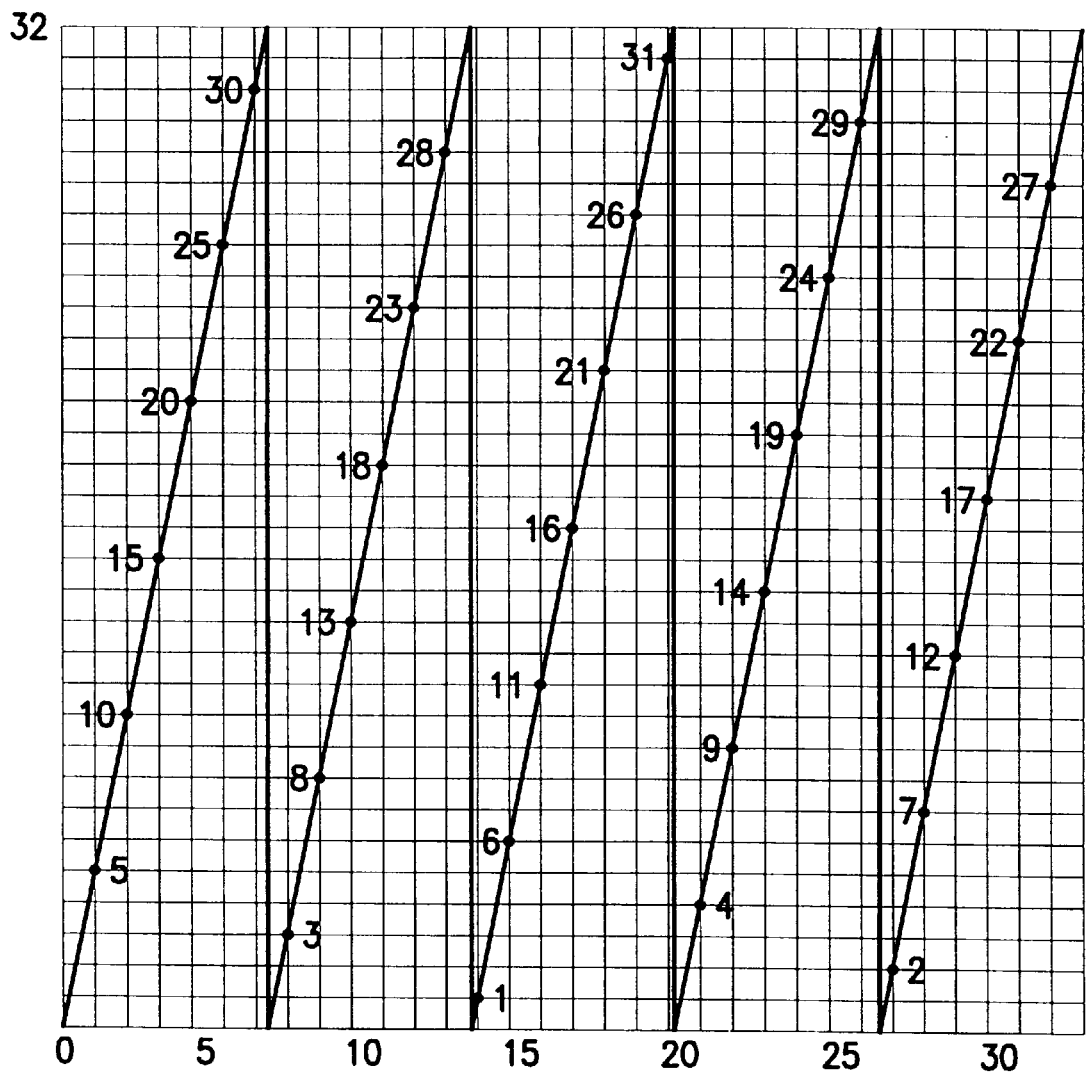
FIG. 5–FIG. 7 depict waveforms of related signals of the present invention.

FIG. 5 depicts a waveform of the first sawing sampling signal saw1 from the first no-carry N-bit counter 41. In FIG. 5, each scale of the abscissa represents a period of the system clock signal CLK, and the ordinate represents the amplitude of the related signal. Because the initial value of the first delay register D1 is 0, thus the output of the first adder A1 is 0. After the first period of the system clock signal CLK is passed, the output of the first no-carry N-bit counter 41 is 5, the value of the first delay register D1 becomes 5, and so on. After the 7th period of the system clock signal CLK is passed, the output of the first adder A1 is 3, instead of 7×5=35. That is because the first adder A1 is a no-carry 5-bit adder. When the output of the first adder A1 exceeds 31, the output minus 32 is executed. So, at 7th period, the output of the first adder A1 is 35−32=3. Repeatedly, a waveform of the first sawing-wave sampling signal saw1 is obtained, as shown in FIG. 5. In FIG. 5, numbers near the waveform are each result from the first adder A1.

Figure 6:
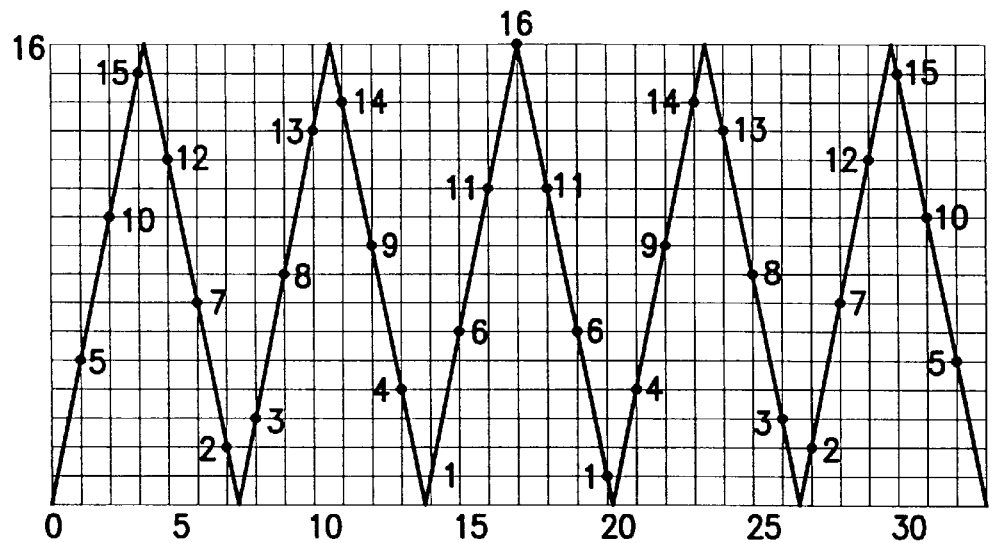
Figure 7:
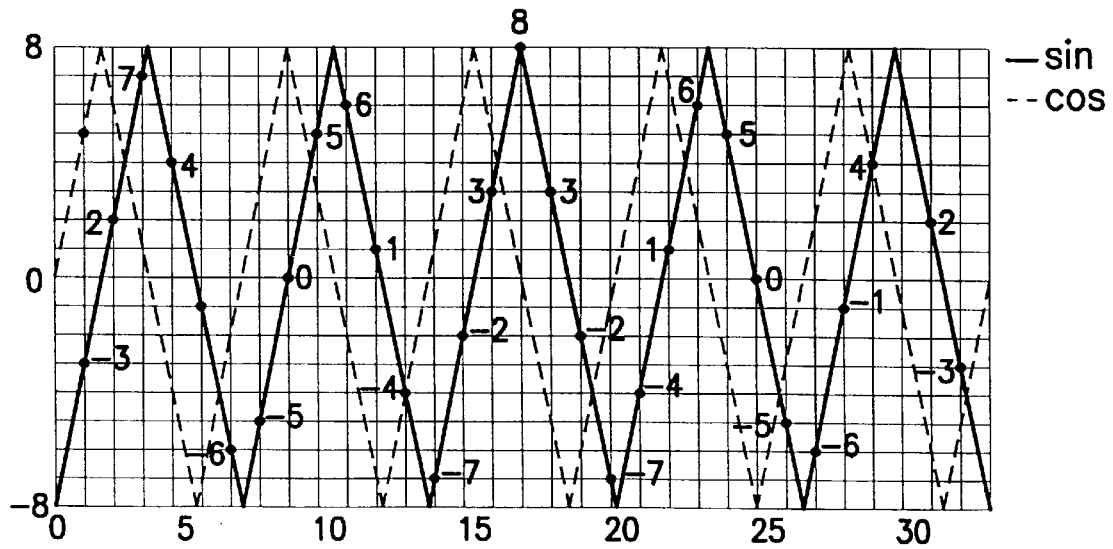

FIG. 6 depicts a waveform of the first positive trigonometric sampling signal tri1 from the first folder 43. In FIG. 6, each scale of the abscissa represents a period of the system clock signal CLK, and the ordinate represents amplitude of the first positive trigonometric sampling signal tri1. The maximal amplitude is 16. FIG. 7 depicts a waveform of the first subcarrier signal sin.

In PAL system, the frequency ratio of the system clock signal and the subcarrier signal is about 32:5. From FIG. 7, it is known that there are 5 periods of the first subcarrier signal sin in 32 periods of the system clock signal. The frequency ratio in FIG. 7 is 32:5 and meets requirements of PAL system.

Generation of the second subcarrier signal cos is similar to that of the first subcarrier signal sin. The initial value of the second delay register D2 is 8, so that of the subcarrier signal cos is 0. From FIG. 7, it is known that the phase-delay of the subcarrier signal cos is about 90° behind the subcarrier signal.

Although the invention in connection with preferred embodiments has been described, modifications will now doubtlessly be apparent to those skilled in this technology. The foregoing description of the preferred embodiments of the invention has been provided for the purposes of illustration and description. It is not intended to be exhaustive or to limit the invention to the precise embodiment disclosed herein. The disclosed embodiment has been chosen and described to best explain the principles of the invention and its practical application, thereby enables those skilled in this technology to understand the invention, to practice various other embodiments thereof and to make various modifications suited to the particular use contemplated of the present invention. As such, it is intended that the scope of this invention shall not be limited to the disclosure, but rather shall be defined by the following claims and their equivalents.

What is claimed is:

1. An image encoder, comprising:
   a subcarrier signal generator for receiving a system clock signal to generate two trigonometric signals, a first subcarrier signal and a second subcarrier signal which has a phase-delay of 90 behind the first subcarrier signal;
   a first modulator for modulating the first subcarrier signal and a first image signal into a first modulation signal;
   a second modulator for modulating the second subcarrier signal and a second image signal into a second modulation signal;
   an adder for adding the first modulation signal and the second modulation signal into a synthesis signal; and
   a clipper for clipping amplitude of the synthesis signal and outputting a color signal;
   wherein said subcarrier generator includes:
   a first no-carry N-bit counter with an initial value of 0 for counting an N-bit predetermined value to output a first sawing-wave sampling signal in each period of the system clock signal, wherein each sampling value is N-bit;
   a second no-carry N-bit counter with an initial value of 2(N−2) for counting the N-bit predetermined value to output a second sawing-wave sampling signal in each period of the system clock signal, wherein each sampling value is N-bit;
   a first folder for folding the first sawing-wave sampling signal into a first positive trigonometric sampling signal which is of (N+1)-bit and has a MSB of 0;

a second folder for folding the second sawing-wave sampling signal into a second positive trigonometric sampling signal which is of N+1 bits and has a MSB of 0;

a first shifter for shifting the first positive trigonometric sampling signal as the first subcarrier signal which is symmetrical and of N-bit; and a second shifter for shifting the second positive trigonometric sampling signal as the second subcarrier signal which is symmetrical and of N-bit.

2. The image encoder of claim 1, wherein the first no-carry N-bit counter comprises:

a first N-bit delay register with an initial value of 0; and a first adder for adding the N-bit predetermined value and an output of the first N-bit delay register to output the first sawing-wave sampling signal feedback to the first N-bit delay register.

3. The image encoder of claim 1, wherein the second no-carry N-bit counter comprises:

a second N-bit delay register with an initial value of $2^{N-2}$; and a second adder for adding the N-bit predetermined value and an output of the second N-bit delay register to output the second sawing-wave sampling signal feedback to the second N-bit delay register.

4. The image encoder of claim 1, wherein the first shifter is an adder adding $-2^{N-2}$ to the first positive trigonometric sampling signal.

5. The image encoder of claim 1, wherein the second shifter is an adder adding $-2^{N-2}$ to the second positive trigonometric sampling signal.

6. The image encoder of claim 1, wherein N is a positive integer, and has a minimum of 5.

7. The image encoder of claim 6, wherein the N-bit predetermined value is $5 \times 2^{N-5}$ in PAL system, and $4 \times 2^{N-5}$ in NTSC system.

8. A subcarrier signal generator, receiving a system clock signal to generate a trigonometric signal, comprising:

a no-carry N-bit counter for counting an N-bit predetermined value to output a sawing-wave sampling signal in each period of the system clock signal, wherein each sampling value is N-bit; and a folder for folding the sawing-wave sampling signal into a positive trigonometric sampling signal which is of N+1 bits and has a MSB of 0; and a shifter for shifting the positive trigonometric sampling signal as the second subcarrier signal which is symmetrical and of N bit(s).

9. The subcarrier signal generator of claim 8, wherein the no-carry N-bit counter comprises:

an N-bit delay register; and a adder for adding the N-bit predetermined value and an output of the N-bit delay register to output the sawing-wave sampling signal feedback to the N-bit delay register.

10. The subcarrier signal generator of claim 8, wherein the shifter is an adder for adding $-2^{N-2}$ to the positive trigonometric sampling signal.

11. The subcarrier signal generator of claim 8, wherein N is a positive integer.

* * * * *